United States Patent [19]

Walker

[11] Patent Number: 4,525,655
[45] Date of Patent: * Jun. 25, 1985

[54] TWO STAGE ELECTRIC DRIVE

[76] Inventor: David E. Walker, 1055 Shawnmarr Rd., #90, Mississauga, Ontario, Canada, L5H 3V2

[*] Notice: The portion of the term of this patent subsequent to Apr. 25, 1998 has been disclaimed.

[21] Appl. No.: 96,800

[22] Filed: Nov. 23, 1979

[51] Int. Cl.³ .............................................. H02K 17/34
[52] U.S. Cl. ......................................... 318/45; 318/8; 318/11; 318/13; 318/15; 310/112
[58] Field of Search ....................... 318/45, 46, 48, 49, 318/86, 111–113, 67, 8, 11–15, 68, 72, 77, 102, 52, 34; 310/112; 188/82.1, 82.77

[56] References Cited

U.S. PATENT DOCUMENTS

| | | | |
|---|---|---|---|
| 2,436,582 | 2/1948 | Lear | 318/8 |
| 2,436,936 | 3/1948 | Page | 318/45 X |
| 2,685,350 | 8/1954 | Falk | 188/82.77 |
| 3,498,569 | 3/1970 | Kjos | 310/112 X |
| 3,559,008 | 1/1971 | Stut et al. | 318/8 |

OTHER PUBLICATIONS

"Books In Print" 1983–1984, vol. 5, Titles G–D R. R. Bowker Co. New York and London p. 2179.

Primary Examiner—Ulysses Weldon
Attorney, Agent, or Firm—George A. Rolston

[57] ABSTRACT

An electric motor drive system having a first direct current electric motor, a first drive shaft to which the first electric motor is coupled, a second direct current electric motor having a higher power rating than the first, a second drive shaft to which the second electric motor is coupled, the second drive shaft comprising a hollow sleeve with the first drive shaft extending therethrough, an epicyclic gear system comprising a sun gear to which the first drive shaft is coupled, a ring gear to which the second drive shaft is coupled, and planetary gears meshing with both the sun gear and the ring gear, an output drive coupled to the planetary gears, and, a one way rotation restraining means coupled to the ring gear to permit rotation of the ring gear in one direction and to prevent rotation of the ring gear in the other direction.

8 Claims, 3 Drawing Figures

TWO STAGE ELECTRIC DRIVE

The invention relates to a drive system for use with electric motors.

BACKGROUND OF THE INVENTION

DC motors have certain characteristics rendering them particularly suitable for drive systems requiring repeated start-stop operation. Typically, such drive systems are used in hoists, and elevators, many kinds of industrial machinery, and also in a variety of different vehicles.

However, it is well known that the power consumption for any given electric motor, during acceleration, and especially during acceleration from zero, is much greater than the power consumption required for steady state operation. The operation of such electric motors under conditions requiring repeated start-stop functions therefore involves a somewhat excessive power consumption.

Numerous attempts have been made to reduce this excessive power consumption during start-up, or acceleration from zero. One approach has been to provide an electric motor having an armature with multiple windings which may be connected or disconnected at various speeds.

A more complex proposal is the "Ward-Leonard" system, using both a motor and a generator, but it was expensive and not suitable for general use.

Other systems employ two or more separate windings, but with only limited success. Another approach altogether has been to provide for a two-speed operation, for example in elevator and hoist motors, where a slow and fast operation are required, by providing what are in effect two separate electric motors, with armatures actually fastened to the same shaft, in tandem.

However, such systems are of somewhat limited utility, and only provide for a very limited improvement over the use of a single motor.

In addition, since the system essentially involves the use of a simple two-speed operation, it is not generally speaking capable of providing a smooth continuous acceleration over a wide speed range, and in fact experiences the well known fluctuations in power consumption.

It is clearly desirable from a viewpoint of economy, and flexibility to provide an electric drive system which is capable of providing smooth continuous acceleration from zero, up to a desired maximum, with a minimum of fluctuations in power consumption, and at the same time providing such advantages within a reasonable cost.

BRIEF SUMMARY OF THE INVENTION

The invention therefore comprises an electric drive system comprising a first electric motor having a predetermined power rating, a first drive shaft to which said motor is connected, a second electric motor having a predetermined power rating, having a relationship to the power rating of said first motor which is between about 1.5:1 and 3:1, and preferably 2:1, a second drive shaft to which said second motor is connected, said second drive shaft comprising a sleeve member, with said first drive shaft passing therethrough concentrically therewith, an epicyclic gear train system comprising a sun gear, said first shaft being directly connected to said sun gear for driving the same, and further comprising a ring gear, said second shaft being directly connected to said ring gear for driving the same, and a plurality of planetary gears meshing with said sun gear and said ring gear, and output drive means coupled to said planetary gears and adapted to be driven thereby, and, one-way rotation restraining means coupled to said ring gear for restraining rotation of the same in one direction, while permitting free rotation of the same in the opposite direction in response to driving of said second motor.

The invention also provides a method of operating an electric drive system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
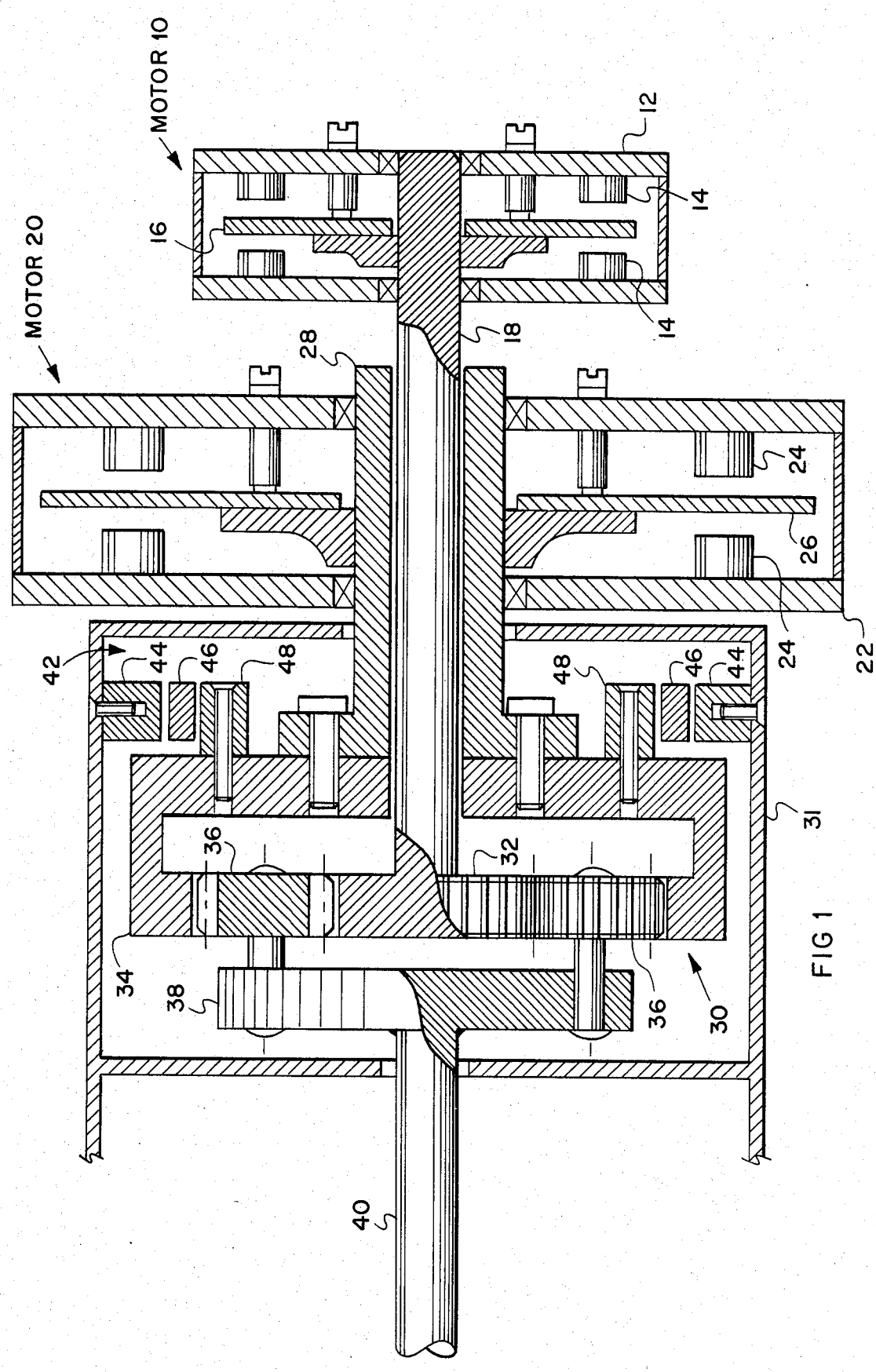
FIG. 1 is a schematic illustration, consisting of a side elevation in section, showing an electric drive system according to the invention.

As shown in the drawings, this preferred embodiment of the invention comprises a first motor indicated generally as 10, having a housing 12, carrying stators 14, the housing 12 being mounted on any suitable support (not shown), such as is well known in the art. An armature 16 is keyed to inner shaft 18 in driving relation thereto.

Motor 10 will have a predetermined rated horsepower for example 1/5 horse-power, and will be a DC motor of a suitable design.

A second larger motor 20 is also provided, having a housing 22, mounted on any suitable mounting or framework (not shown) such as is well known in the art. Within the housing 22 there are provided the usual stators 24, and an armature 26 coupled to shaft 28. Shaft 28 comprises a cylindrical sleeve member fitting around shaft 18 concentrically therewith, so that shaft 18 may be driven by motor 10 and shaft 28 by motor 20.

Motor 20 is preferably of a predetermined larger rated horse-power for example ⅖ horse-power, and will be a DC motor of a suitable design.

Obviously, such motors 10 and 20 will also incorporate the usual features found in such motors, for any particular application, the motors 10 and 20 being illustrated purely by way of example, and without any limiting characteristics.

In order to couple the two motors 10 and 20 together, shaft 18 and shaft 28 are both coupled to an epicyclic gear train system indicated generally as 30, in housing 31.

Shaft 18 is coupled to sun gear 32 of gear system 30, and shaft 28 is coupled to ring gear 34 of the same gear train system 30.

A plurality of planetary gears 36 running between the sun gear 32 and ring gear 34 are mounted on a common driven member 38 which is in turn connected to output drive means 40, typically being an output drive shaft or the like.

It is desirable to provide means for holding the ring gear 34 against rotation in one direction, while permitting the same to rotate freely in the opposite direction in response to rotative power supplied by motor 20.

Accordingly, a one way rotation restraining system 42 is provided of any suitable design, which is essentially similar to a free wheel system.

In the illustration, such a one-way restraining system 42 is shown operating directly on ring gear 34. It will however be appreciated that this is purely by way of example. It could equally well operate on shaft 28, or some other member attached to shaft 28, or in any other way.

The restraining system 42 comprises an outer ring 44 fastened to housing 31, an intermediate roller race 46, and an inner ramp ring 48, fastened to ring gear 34. Such a one way restraining systems is used commercially in transmissions, and is known as a Sprag clutch.

In whatever way such a one-way restraining system 42 is attached, the ring gear 34 is free for of rotation only in one direction, in response to driving by motor 20. When motor 20 is idle, then ring gear 34 is incapable of rotation in the reverse direction, due to operation of the one way restraining systems 42.

In operation, it is assumed that the electrical drive system as shown is installed in a vehicle typically a road vehicle similar to an automobile, powered for example by electric storage batteries, or any other source of electric power.

Upon start-up from zero r.p.m., only motor 10 is operated. Power is applied to motor 10, which then through shaft 18 commences rotation of sun gear 32. Initially the power requirement of motor 10 will be high and will decrease rapidly, in accordance with a predetermined curve for that motor until an efficient rate of rotation is achieved. However, motor 10 is of relatively smaller power rating, and consequently the excess power consumption during this brief acceleration period is relatively small.

Rotation of sun gear 32 will cause rotation of planetary gears 36, while ring gear 34 is held stationary by restraining system 42. By the provision of suitable gear ratios, the rotation of planetary gears 36 will cause rotation of output shaft 40, at approximately a 3:1 reduction as compared to the rate of rotation of shaft 18.

Accordingly, motor 10 on its own will provide for the initial acceleration of the vehicle from start-up, through the epicyclic gear system 30, with the mechanical advantage of the 3:1 reduction described.

Motor 10 will thus rapidly reach its maximum designed r.p.m. while producing acceleration of the vehicle up to a certain limited speed, with an economical use of the power available.

Once motor 10 is at its maximum r.p.m. or at least within an efficient range of operating r.p.m., depending of course upon the design of the motor itself, then power is supplied to motor 20. Since motor 20 is much larger, in fact has a rated power output approximately double that of motor 10, the power required for the initial start-up from zero r.p.m. of motor 20 if it was under load would be much greater. In order, therefore, to reduce the load on motor 20 and thus reduce power requirements during starting, power is reduced to motor 10, and is fed to motor 20, in such proportions that motor 20 is permitted to accelerate rapidly up to the output speed, i.e. the speed at which the output shaft is then operating. During this brief transitional period, the speed of the output shaft will remain more or less constant, the load being divided between motors 10 and 20, in varying proportions, as motor 20 is accelerated In this way the motor 20 accelerates under almost no load conditions since motor 20 will drive shaft 28, causing rotation of ring gear 34 in the same direction as drive shaft 18. Rotation of ring gear 34 will cause rotation of planetary gears 36, which will rotate around sun gear 32 while sun gear 32 is in fact slowing down.

The r.p.m. of output shaft 40 will thus remain stable, during the acceleration of motor 20, over its initial somewhat inefficient range of operation.

As soon as motor 20 has reached a more efficient range of operating r.p.m. then power is supplied to both motors 10 and 20 as desired.

The power supplied to the two motors is so regulated as to bring them into synchronism so that they are both rotating at the same r.p.m. as soon as possible so that a condition is reached in which the entire epicyclic gear system 30 is rotating as a single unit, producing effectively a 1:1 drive relationship, as between both shaft 18 and 28 which are rotating concentrically and at identical r.p.m. and output shaft 40.

Once the two motors are balanced and in synchronism, then power can be increased simultaneously to both motors up to their rated maximum, for maximum power output from both motors simultaneously.

It will thus be seen that the excessive peaks or steps of power consumption which would normally be experienced accelerating a larger motor such as motor 20, from zero to an efficient range of operating r.p.m. have effectively been reduced or smoothed out, and have been replaced by the relatively minor power consumption encountered during acceleration of motor 10, which is much smaller, from zero up to its efficient operating range.

At the same time, by arranging the gear ratios of the epicyclic gear system 30, together with the power outputs of the two motors, it is possible to achieve a system which can be operated at maximum power output for both motors, with the epicyclic gear system 30 effectively locked in unison, so that both motors are driving together.

Figure 2:
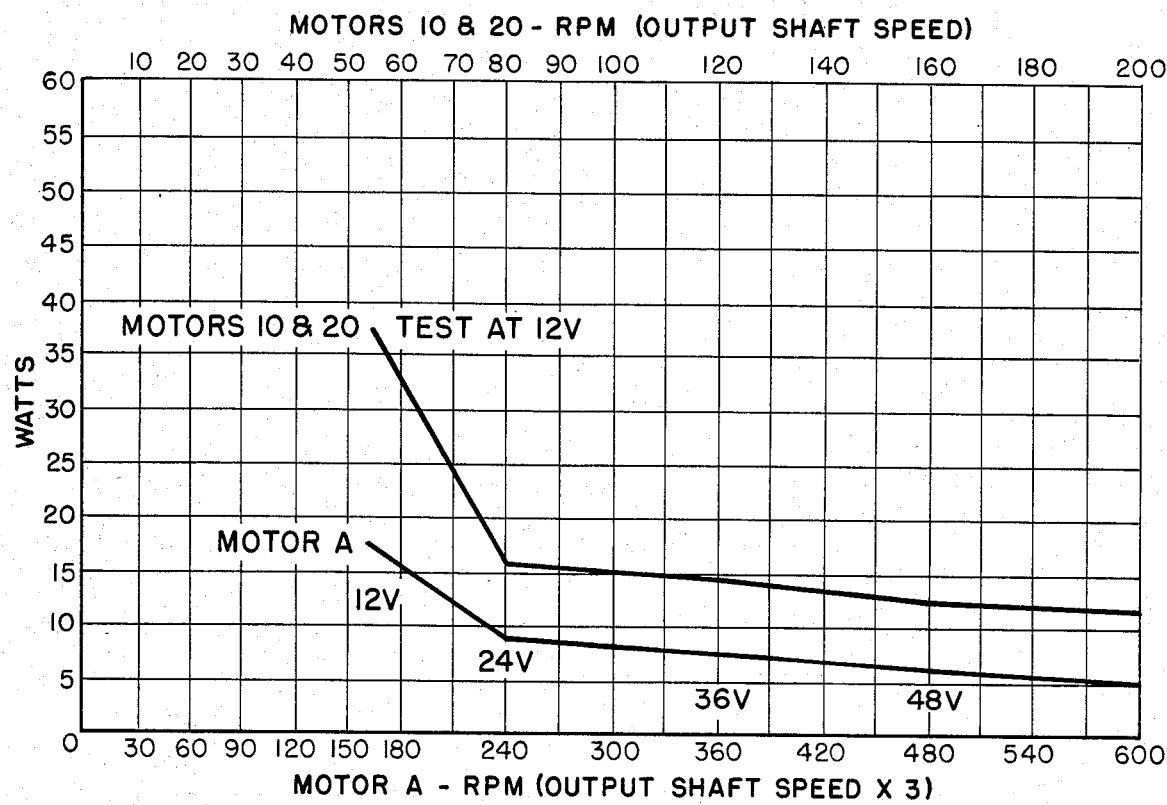
FIG. 2 is a graph showing the power consumption curves.

With reference to FIG. 2, it will be seen that the lower curve is indicated as motor 10, and the upper curve is indicated as motors 10 and 20.

Tests were conducted with the output shaft 40 connected to a dynamometer. Readings were taken for motor 10 alone, and for motors 10 and 20 combined, at identical dynamometer settings.

Both motors of this type would normally have a maximum r.p.m. in the region of 3000 r.p.m. or more.

Motors of this type operate in an almost linear manner, over certain ranges of their performance, consuming relatively very high power requirements at low r.p.m. and then becoming rapidly and progressively more efficient at higher r.p.m.

Figure 3:
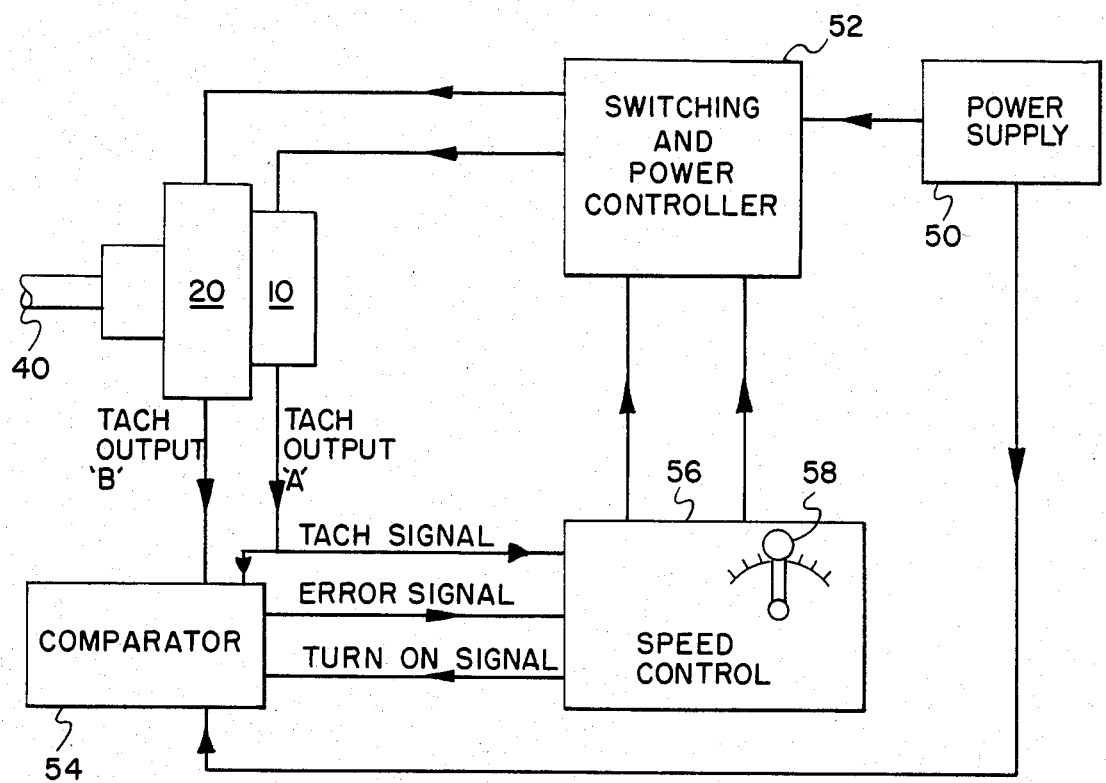
FIG. 3 is a schematic circuit diagram.

While various circuits, and in many cases simple manual controls would suffice to provide the functions described above, a circuit that is particularly suitable for the purpose is disclosed in FIG. 3.

In this case motors 10 and 20 are shown together with the gear train 30 and the output shaft 40.

Power is supplied, from a power supply indicated generally as 50 which may be a series of storage cells or batteries, or any other suitable source of electric power. The power supply is connected through a switching and power control 52, directly to the motors 10 and 20.

The motors 10 and 20 are of the type incorporating suitable sensing devices for reading the r.p.m. of each motor in a manner well known in the art and requiring no further description.

The r.p.m. or tachometer output from each of the motors 10 and 20 is connected to a comparator circuit 54, which in turn is connected to a speed control 56. Speed control circuit 56 may be entirely automatic, and incorporating means for presetting various desired speeds. Alternatively, it may have a variable speed manual or other control 58, similar to an accelerator pedal in for example an electrically powered vehicle.

Power is supplied for the operation of the speed control and the comparator from the power supply 50.

In addition, a further connection is made between the tachometer signal of the motor 10 and the speed control 56.

In the operation of this circuit, initial operation of the speed control 58 will cause power control 52 to supply power to a motor 10. Motor 10 will then accelerate rapidly up to its efficient operating r.p.m., and a tachometer or r.p.m. signal will be delivered from motor 10 to speed control 56 and also to comparator 54.

There will be a large error signal generated in the comparator 54 which will then be communicated to the speed control 56. This will then cause switching and power control 52 to reduce power supplied to motor 10 and supply power to motor 20 in proportion.

This will very rapidly bring the two r.p.m. signals received in the comparator 54 into synchronism so that the error signal is reduced to zero, causing appropriate signals from speed control 56 to in turn cause switching and power control 52 to provide balanced power to both motors 10 and 20.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. An electric motor drive system which comprises;
   a first direct current electric motor having a predetermined power rating;
   a first drive shaft to which said first electric motor is drivingly coupled;
   a second direct current electric motor having a predetermined power rating higher than said first motor;
   a second drive shaft to which said second electric motor is drivingly coupled, said second drive shaft comprising a hollow sleeve member with said first drive shaft extending generally axially therethrough;
   an epicyclic gear system in turn comprising;
   a sun gear to which said first drive shaft is drivingly coupled for rotation in a forward direction;
   a ring gear to which said second drive shaft is drivingly coupled for rotation is said forward direction;
   a plurality of planetary gears meshing with both said sun gear and said ring gear;
   an output drive coupled to said planetary gears for conjoint rotation therewith about said sun gear, and,
   one-way freewheel rotation restraining means operatively coupled to said ring gear and restraining rotation of said ring gear in a reverse direction only, said rotation restraining means permitting free rotation in said forward direction whereby said ring gear is free to rotate in said forward direction under the influence of said second motor.

2. An electric motor drive system as claimed in claim 1 and which additionally comprises operating control means which in turn comprise:
   a first tachometer operatively coupled to said first electric motor and operative to provide a first speed signal indicative of the speed of rotation of said first electric motor;
   a second tachometer operatively coupled to said second electric motor and operative to provide a second speed signal indicative of the speed of rotation of said second electric motor;
   a comparator operatively connected to said first and second tachometers and adapted to compare said first and second speed signals and to provide an error signal indicative of the difference between said first and second speed signals;
   a switching and power controller operatively connected to said first and second electric motors and operative individually to control the power supply to each of said first and second electric motors, and,
   a speed controller operatively connected to said first tachometer, to said comparator and to said switching and power controller and operative to receive an error signal from said comparator and provide a control signal to said switching and power controller to cause said controller to supply power to said second electric motor.

3. An electric motor drive system as claimed in claim 2 and in which said speed controller additionally comprises independently operable speed control means.

4. An electric motor drive system as claimed in claim 1 and in which said second electric motor has a power rating relative to the power rating of said first electric motor of from about 1.5:1 to about 3:1.

5. An electric motor drive system as claimed in claim 4 and in which said second electric motor has a power rating relative to the power rating of said first electric motor of about 2:1.

6. An electric motor drive system as claimed in claim 1 and in which the gear ratios of said sun gear, said planetary gears and said ring gear are such as to provide a 3:1 gear ratio between said first drive shaft and said output drive when said ring gear is stationary and a 1:1 gear ratio between said first and second drive shafts, on the one hand, and said output drive, on the other hand, when said first and second drive shafts are rotating at identical speeds.

7. A method of operating an electric motor drive system which comprises;
   a first direct current electric motor having a predetermined power rating;
   a first drive shaft to which said first electric motor is drivingly coupled;
   a second direct current electric motor having a predetermined power rating higher than said first motor;
   a second drive shaft to which said second electric motor is drivingly coupled, said second drive shaft comprising a hollow sleeve member with said first drive shaft extending generally axially therethrough;
   an epicyclic gear system in turn comprising;
   a sun gear to which said first drive shaft is drivingly coupled for rotation in a forward direction;

a ring gear to which said second drive shaft is drivingly coupled for rotation in said forward direction, and, a plurality of planetary gears meshing with both said sun gear and said ring gear;

an output drive coupled to said planetary gears for conjoint rotation therewith about said sun gear;

a one-way freewheel rotation restraining means operatively coupled to said ring gear to prevent rotation of said ring gear in a reverse direction only, and being inoperative in said forward direction whereby said ring gear is free to rotate in said forward direction under the influence of said second motor;

and which method comprises the steps of;

supplying electrical power to said first electric motor to cause rotation of said first drive shaft and said sun gear in said forward direction;

restraining said ring gear from rotating in said reverse direction by said restraining means;

subsequently supplying electrical power to said second electric motor to cause rotation of said second drive shaft and said ring gear in said forward direction, and, increasing the supply of electrical power to said second electric motor and decreasing the supply of electrical power to said first electric motor until said first and second drive shafts are rotating in synchronism in said forward direction.

8. A method as claimed in claim 7 and which comprises the further step of comparing speed signals from first and second tachometers operatively coupled to said first and second electric motors respectively to provide an error signal indicative of the difference between the speeds of rotation of said first and second electric motors and controlling the supply of electric power to said first and second electric motors in response to the magnitude of said error signal so as to minimize that signal.

* * * * *